(12) United States Patent
Urabayashi et al.

(10) Patent No.: US 11,051,209 B2
(45) Date of Patent: Jun. 29, 2021

(54) MOBILE COMMUNICATION METHOD, BASE STATION, AND USER TERMINAL

(71) Applicant: KYOCERA CORPORATION, Kyoto (JP)

(72) Inventors: Hiroyuki Urabayashi, Yokohama (JP); Chiharu Yamazaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/268,705

(22) Filed: Feb. 6, 2019

(65) Prior Publication Data

US 2019/0182715 A1 Jun. 13, 2019

Related U.S. Application Data

(63) Continuation of application No. PCT/JP2017/028001, filed on Aug. 2, 2017.

(60) Provisional application No. 62/373,159, filed on Aug. 10, 2016.

(51) Int. Cl.
*H04W 28/20* (2009.01)
*H04W 76/27* (2018.01)
*H04L 5/00* (2006.01)
*H04W 72/04* (2009.01)
*H04W 4/70* (2018.01)

(52) U.S. Cl.
CPC .......... *H04W 28/20* (2013.01); *H04L 5/0092* (2013.01); *H04L 5/0094* (2013.01); *H04W 76/27* (2018.02); *H04W 4/70* (2018.02); *H04W 72/042* (2013.01); *H04W 72/0453* (2013.01)

(58) Field of Classification Search
CPC .................................................. H04W 28/20
See application file for complete search history.

(56) References Cited

U.S. PATENT DOCUMENTS

| 10,111,224 B2 | 10/2018 | Lee et al. | |
| 2013/0121274 A1* | 5/2013 | Chen | H04L 5/0053 370/329 |
| 2013/0136095 A1* | 5/2013 | Nishio | H04L 5/14 370/329 |

(Continued)

FOREIGN PATENT DOCUMENTS

| JP | 2014-531856 A | 11/2014 |
| JP | 2016-507984 A | 3/2016 |

(Continued)

OTHER PUBLICATIONS

3rd Generation Partnership Project; Technical Specification Group Radio Access Network; Study on provision of low-cost Machine-Type Communications (MTC) User Equipments (UEs) based on LTE, (Release 12), 3GPP TR 36.888 V12.0.0, Jun. 2016, pp. 1-55, Valbonne, France.

*Primary Examiner* — John D Blanton
(74) *Attorney, Agent, or Firm* — Studebaker & Brackett PC

(57) ABSTRACT

A mobile communication method according to an embodiment includes a step in which a base station configured to perform communication by using a narrow band which is a second bandwidth narrower than a first bandwidth compatible with a first user terminal in one unit time transmits information for allocating a second user terminal an extended band having a third bandwidth wider than the second bandwidth and narrower than the first bandwidth in the one unit time.

10 Claims, 13 Drawing Sheets

(56) References Cited

U.S. PATENT DOCUMENTS

| | | | |
|---|---|---|---|
| 2015/0229444 A1* | 8/2015 | Webb | H04W 72/1278 |
| | | | 370/329 |
| 2015/0296514 A1* | 10/2015 | Morioka | H04W 72/048 |
| | | | 370/329 |
| 2015/0327284 A1 | 11/2015 | Wakabayashi | |
| 2017/0019915 A1* | 1/2017 | Nogami | H04L 5/0053 |
| 2018/0332566 A1* | 11/2018 | You | H04L 1/0091 |
| 2019/0116609 A1* | 4/2019 | Feng | H04W 4/46 |
| 2019/0174283 A1* | 6/2019 | Awad | H04L 5/0092 |
| 2020/0015278 A1* | 1/2020 | Yu | H04W 72/02 |

FOREIGN PATENT DOCUMENTS

| | | |
|---|---|---|
| JP | 2016-509803 A | 3/2016 |
| WO | 2013/116972 A1 | 8/2013 |

* cited by examiner

FIG. 8

| HIGHER LAYER PARARAMETER 'pdsch-maxNumRepetitionCEmodeA' | {n1,n2,n3,n4} |
|---|---|
| NOT CONFIGURED | {1,2,4,8} |
| 16 | {1,4,8,16} |
| 32 | {1,4,16,32} |

MOBILE COMMUNICATION METHOD, BASE STATION, AND USER TERMINAL

RELATED APPLICATION

This application is a continuation application of international application PCT/JP2017/028001, filed Aug. 2, 2017, which claims the benefit of U.S. Provisional Application No. 62/373,159 filed Aug. 10, 2016, the entire contents of which are incorporated herein by reference.

TECHNICAL FIELD

The present disclosure relates to a mobile communication method, a base station, and a user terminal.

BACKGROUND ART

The 3rd Generation Partnership Project (3GPP), which is the standardization project for mobile communication systems, has studied a technology (hereinafter, Machine Type Communication (MTC)) that performs communication with a second user terminal in one unit time (for example, 1 subframe=1 msec) by using a second bandwidth (for example, 6 PRB (physical resource block)=1.08 MHz) that is narrower than a first bandwidth (for example, 9 MHz) compatible with a first user terminal (see Non Patent Literature 1).

SUMMARY

A mobile communication method according to an embodiment includes a step in which a base station configured to perform communication by using a narrow band which is a second bandwidth narrower than a first bandwidth compatible with a first user terminal in one unit time transmits information for allocating a second user terminal an extended band having a third bandwidth wider than the second bandwidth and narrower than the first bandwidth in the one unit time.

A base station according to an embodiment includes: a controller; and a transmitter. The controller is configured to perform communication by using a narrow band which is a second bandwidth narrower than a first bandwidth compatible with a first user terminal in one unit time. The transmitter is configured to transmit, to a second user terminal, information for allocating the extended band having a third bandwidth wider than the second bandwidth and narrower than the first bandwidth in the one unit time.

A user terminal according to an embodiment includes a receiver. The receiver is configured to receive, from a base station configured to perform communication by using a narrow band which is a second bandwidth narrower than a first bandwidth compatible with a first user terminal in one unit time, information for allocating an extended band having a third bandwidth wider than the second bandwidth and narrower than the first bandwidth in the one unit time.

BRIEF DESCRIPTION OF DRAWINGS

FIG. 8 is a diagram for explaining an application scene according to an embodiment.

DESCRIPTION OF EMBODIMENTS

Figure 1:
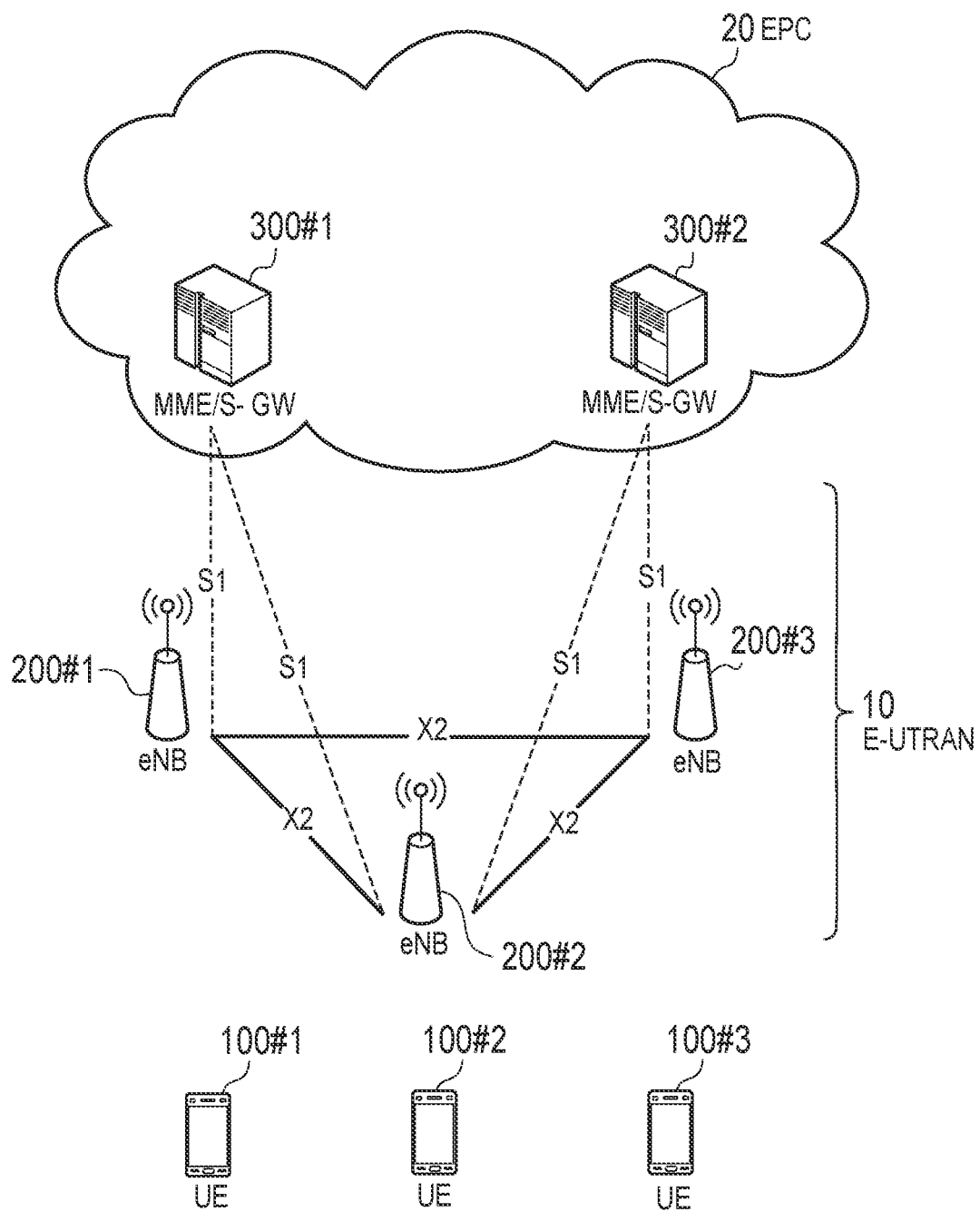
FIG. 1 is a configuration diagram of an LTE system according to an embodiment.

Hereinafter, a mobile communication system according to an embodiment will be described with reference to the drawings. In the following description of the drawings, the same or similar reference numerals are assigned to the same or similar parts.

However, it should be noted that the drawings are schematic and ratios of dimensions and the like may be different from actual ones. Therefore, concrete dimensions and the like should be determined with reference to the following explanation. It is a matter of course that the drawings also include parts having different dimensional relationships or ratios between the drawings.

SUMMARY OF DISCLOSURE

In the MTC described in the background art, a second user terminal having a low data amount and low mobility is studied as a target. However, considering a use case in which MTC is applied to a wearable terminal, it is desirable to increase the throughput in the MTC.

A mobile communication method according to an embodiment includes a step in which a base station configured to perform communication by using a narrow band which is a second bandwidth narrower than a first bandwidth compatible with a first user terminal in one unit time transmits information for allocating a second user terminal an extended band having a third bandwidth wider than the second bandwidth and narrower than the first bandwidth in the one unit time.

The mobile communication method may further include a step in which the user terminal performs communication with the base station by using the allocated extended band based on the information received from the base station.

The extended band may be constituted by a plurality of narrow bands.

A table including a group associated with the extended band may be defined. The information may be information indicating the group included in the table.

The information may indicate the length of the extended band in a frequency direction.

The information may include information indicating an arrangement of physical resource blocks allocated to the second user terminal in the extended band.

The base station according to one embodiment includes a controller and a transmitter. The controller is configured to perform communication by using the narrow band which is the second bandwidth narrower than the first bandwidth compatible with the first user terminal in one unit time. The transmitter is configured to transmit, to the second user terminal, information for allocating the extended band having the third bandwidth wider than the second bandwidth and narrower than the first bandwidth in the one unit time.

The user terminal according to one embodiment includes a receiver. The receiver is configured to receive, from the base station configured to perform communication by using the narrow band which is the second bandwidth narrower than the first bandwidth compatible with the first user terminal in one unit time, information for allocating the extended band having the third bandwidth wider than the second bandwidth and narrower than the first bandwidth in the one unit time.

In the mobile communication method according to one embodiment, predetermined communication between the base station and the second user terminal is performed by using the narrow band of the second bandwidth narrower than the first bandwidth compatible with the first user terminal in one unit time. The mobile communication method includes: a step A of transmitting, from the base station, information indicating a predetermined number of times of repetitions in the predetermined communication; and a step B of, if a predetermined condition is satisfied, stopping repeated transmission in the predetermined communication with the number of times of repetitions different from the predetermined number of times of repetitions.

The mobile communication method may include a step C of notifying, from the base station, information specifying the number of times of offsets with respect to the predetermined number of times of repetitions. The predetermined condition may be that the number of times of offsets is other than zero. The step B may include a step of stopping repeated transmission in the predetermined communication with the number of times of repetitions based on the number of times of offsets and the predetermined number of times of repetitions.

A list defining the number of times of candidates for the number of times of offsets may be predetermined. The information specifying the number of times of offsets may be information specifying the number of times of candidates used as the number of times of offsets among the number of times of candidates defined in the list.

The list may be determined according to the maximum number of times of repetitions determined by a higher layer.

The number of times of offsets may be determined such that the number of times of repetitions based on the number of times of offsets and the predetermined number of times of repetitions does not exceed the maximum number of times of repetitions.

The step C may be a step in which information specifying the number of times of offsets is included in predetermined control information transmitted from the base station via a predetermined control channel used for the predetermined communication, and the predetermined control information is transmitted.

The number of times of offsets may be determined based on a transmission candidate position of the predetermined control channel used for the predetermined communication. The step C may be a step of notifying information specifying the number of times of offsets according to the transmission candidate position.

The number of times of offsets may be determined based on a mask used for decoding the predetermined control channel used for the predetermined communication. The step C may be a step of notifying information specifying the number of times of offsets according to the value of the mask.

The number of times of offsets to be applied to a downlink communication from the base station to the second user terminal may be determined based on the reception quality of the downlink communication in the second user terminal. The number of times of offsets to be applied to an uplink communication from the second user terminal to the base station may be determined based on the reception quality of the uplink communication in the base station.

The number of times of offsets to be applied to the downlink communication from the base station to the second user terminal may be determined based on information acquired from a neighbour terminal geographically located near the second user terminal.

The mobile communication method may include a step D of, if a receiving node succeeds in receiving a signal from a transmitting node, transmitting a stop indication requesting the stop of the repeated transmission from the receiving node to the transmitting node. The transmitting node may be a node of one of the base station and the second user terminal. The receiving node may be a node of the other of the base station and the second user terminal.

The stop indication may be hybrid automatic repeat request (HARQ) acknowledgment. The stop indication may be defined as a signal used for the predetermined communication.

The stop indication may be transmitted at a predetermined transmission candidate position.

The transmission candidate position may be designated by the base station.

The stop indication may be transmitted at a predetermined transmission candidate position. The step D includes a step of transmitting the stop indication if the repeated transmission is not completed over the predetermined number of times of repetitions during a period from the successful reception of the signal from the transmitting node to the transmission candidate position.

The step D may include a step of transmitting the stop indication after a lapse of a predetermined time from the successful reception of the signal from the transmitting node.

In the mobile communication method according to one embodiment, predetermined communication between the base station and the second user terminal is performed by using the narrow band of the second bandwidth narrower than the first bandwidth compatible with the first user terminal in one unit time. The mobile communication method may include a step A of transmitting, from the base station, narrow band allocation information specifying the extended band having a bandwidth wider than one second bandwidth allocated to the second user terminal in the one unit time.

The narrow band allocation information may be included in the predetermined control information transmitted from the base station via the predetermined control channel used for the predetermined communication.

The narrow band allocation information may be information directly indicating the extended band.

The extended band may be continuous in the frequency direction. The narrow band allocation information may be information indicating the head position of the extended band and the length of the extended band in the frequency direction.

A table including a group associated with the extended band may be defined. The narrow band allocation information may be information indicating the group included in the table.

The narrow band allocation information may be an information element included in a radio resource control (RRC) message. The information element may designate a method of interpreting the predetermined control information transmitted from the base station via the predetermined control channel used for the predetermined communication.

The interpreting method may include at least interpretation that the extended band is allocated.

The narrow band allocation information may be an information element included in a radio resource control (RRC) message. The information element may be an element directly indicating the extended band allocated exclusively to the second user terminal.

The narrow band allocation information may be an information element included in a radio resource control (RRC) message. The information element may be an element indicating a group associated with the extended band.

Resource blocks allocated to the second user terminal may be continuously allocated in the extended band.

The band of the first bandwidth may include a band not used as the narrow band. The extended band may include a band not used as the narrow band.

The base station according to one embodiment performs predetermined communication with the second user terminal by using the narrow band of the second bandwidth narrower than the first bandwidth compatible with the first user terminal in one unit time. The base station includes: a transmitter that transmits information indicating a predetermined number of times of repetitions in the predetermined communication; and a controller that, if a predetermined condition is satisfied, stops repeated transmission in the predetermined communication with the number of times of repetitions different from the predetermined number of times of repetitions.

The second user terminal according to one embodiment performs predetermined communication with the base station by using the narrow band of the second bandwidth narrower than the first bandwidth compatible with the first user terminal in one unit time. The second user terminal includes: a receiver that receives, from the base station, information indicating a predetermined number of times of repetitions in the predetermined communication; and a controller that, if a predetermined condition is satisfied, stops repeated transmission in the predetermined communication with the number of times of repetitions different from the predetermined number of times of repetitions.

The base station according to one embodiment performs predetermined communication with the second user terminal by using the narrow band of the second bandwidth narrower than the first bandwidth compatible with the first user terminal in one unit time. The base station may include a transmitter that transmits narrow band allocation information specifying the extended band having a bandwidth wider than one second bandwidth allocated to the second user terminal in the one unit time.

The second user terminal according to one embodiment performs predetermined communication with the base station by using the narrow band of the second bandwidth narrower than the first bandwidth compatible with the first user terminal in one unit time. The second user terminal may include a receiver that receives narrow band allocation information specifying the extended band having a bandwidth wider than one second bandwidth allocated to the second user terminal in the one unit time.

The mobile communication method according to the summary of the disclosure is a method in which predetermined communication between the base station and the second user terminal is performed by using the narrow band of the second bandwidth narrower than the first bandwidth compatible with the first user terminal in one unit time. The mobile communication method includes: a step A of transmitting, from the base station, information indicating a predetermined number of times of repetitions in the predetermined communication; and a step B of, if a predetermined condition is satisfied, stopping repeated transmission in the predetermined communication with the number of times of repetitions different from the predetermined number of times of repetitions.

In the summary of the disclosure, it is possible to expect an increase in throughput in the MTC by stopping repeated transmission in the predetermined communication with the number of times of repetitions different from the predetermined number of times defined in the existing technology if the predetermined condition is satisfied. For example, if one time, four times, eight times, and sixteen times are defined as the predetermined number of times of repetitions, it is possible to expect an increase in throughput in the MTC by performing nine repeated transmissions instead of sixteen repeated transmissions in an environment in which signal reception is successful with nine repeated transmissions.

The mobile communication method according to the summary of the disclosure is a method in which predetermined communication between the base station and the second user terminal is performed by using the narrow band of the second bandwidth narrower than the first bandwidth compatible with the first user terminal in one unit time. The mobile communication method includes a step A of transmitting, from the base station, narrow band allocation information specifying the extended band having a bandwidth wider than one second bandwidth allocated to the second user terminal in the one unit time.

In the summary of the disclosure, it is possible to expect an increase in throughput in the MTC by extending the narrow band of one second bandwidth that could be allocated to the second user terminal in the existing technology. The extended band may have a bandwidth wider than one second bandwidth. The extended band may include a band of two or more second bandwidths.

Embodiment

An embodiment will be described by taking, as an example, an LTE system based on the 3GPP standard as a mobile communication system.

(System Architecture)

A system architecture of an LTE system according to an embodiment will be described. FIG. 1 is a configuration diagram of an LTE system according to an embodiment.

As illustrated in FIG. 1, the LTE system according to the embodiment includes a user equipment (UE) 100, an evolved-UMTS terrestrial radio access network (E-UTRAN) 10, and an evolved packet core (EPC) 20.

The UE 100 corresponds to a user terminal. The UE 100 is a mobile communication apparatus and performs radio communication with a cell formed by an eNB 200 (a serving cell if the UE 100 is in an RRC connected state). The architecture of the UE 100 will be described later.

The E-UTRAN 10 corresponds to a radio access network. The E-UTRAN 10 includes an evolved Node-B (eNB) 200. The eNB 200 corresponds to a radio base station. The eNBs 200 are connected to each other via an X2 interface. The architecture of the eNB 200 will be described later.

The eNB 200 forms one or more cells and performs radio communication with the UE 100 that has established connection to the cell. The eNB 200 has a radio resource management (RRM) function, a user data routing function, a measurement control function for mobility control and scheduling, and the like. The "cell" is used as the term indicating a minimum unit of radio communication area. The "cell" is used as the term indicating a function of performing radio communication with the UE 100.

The EPC 20 corresponds to a core network. The EPC 20 includes a mobility management entity (MME)/serving-gateway (S-GW) 300. The MME performs various types of mobility control or the like on the UE 100. The S-GW performs user data transfer control. The MME/S-GW 300 is connected to the eNB 200 via an S1 interface. The E-UTRAN 10 and the EPC 20 constitute the network of the LTE system.

Figure 2:
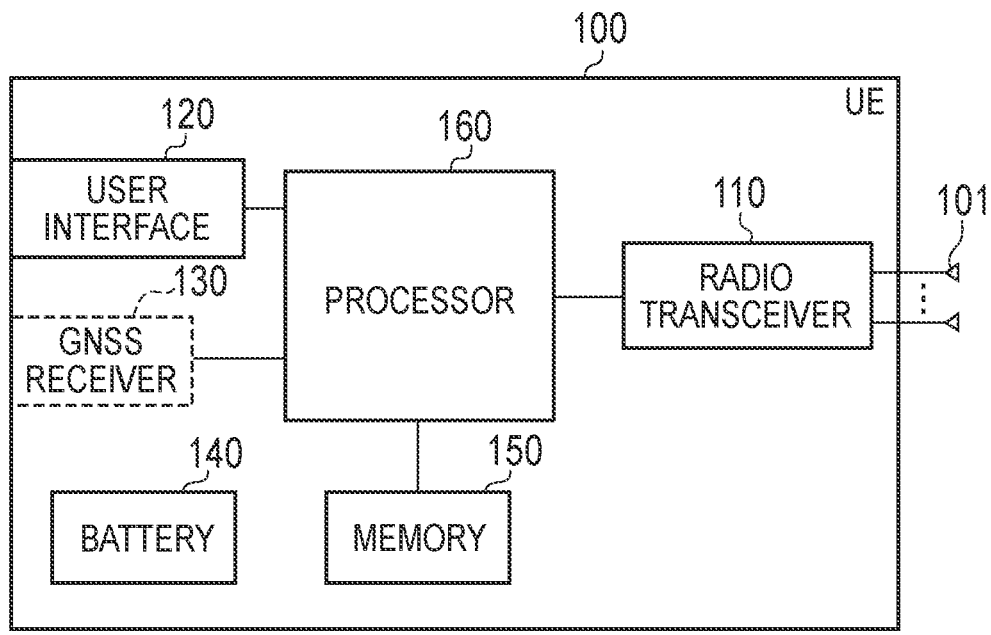
FIG. 2 is a block diagram of a UE 100 according to an embodiment.

FIG. 2 is a block diagram of the UE 100. As illustrated in FIG. 2, the UE 100 includes a plurality of antennas 101, a radio transceiver 110, a user interface 120, a global navigation satellite system (GNSS) receiver 130, a battery 140, a memory 150, and a processor 160. The memory 150 and the processor 160 constitute a controller. The radio transceiver 110 and the processor 160 constitute a transmitter and a receiver. The UE 100 may not include the GNSS receiver 130. The memory 150 may be integrated with the processor 160, and this set (that is, chipset) may be the processor.

The antenna 101 and the radio transceiver 110 are used for transmitting and receiving radio signals. The radio transceiver 110 converts a baseband signal (transmission signal) output by the processor 160 into a radio signal and transmits the radio signal from the antenna 101. The radio transceiver 110 converts a radio signal received by the antenna 101 into a baseband signal (reception signal) and outputs the baseband signal to the processor 160.

The user interface 120 is an interface with a user who possess the UE 100, and includes, for example, a display, a microphone, a speaker, various buttons, and the like. The user interface 120 receives an operation from the user and outputs, to the processor 160, a signal indicating contents of the received operation. The GNSS receiver 130 receives a GNSS signal and outputs the received GNSS signal to the processor 160 so as to obtain position information indicating the geographical position of the UE 100. The battery 140 stores power to be supplied to each block of the UE 100.

The memory 150 stores a program to be executed by the processor 160 and information to be used for processing by the processor 160. The processor 160 includes a baseband processor and a central processing unit (CPU). The baseband processor modulates and demodulates the baseband signal, encodes and decodes the baseband signal, and the like. The CPU executes a program stored in the memory 150 and performs a variety of processes. The processor 160 may further include a codec that performs coding and decoding of an audio or video signal. The processor 160 executes various processes and various communication protocols to be described later.

Figure 3:
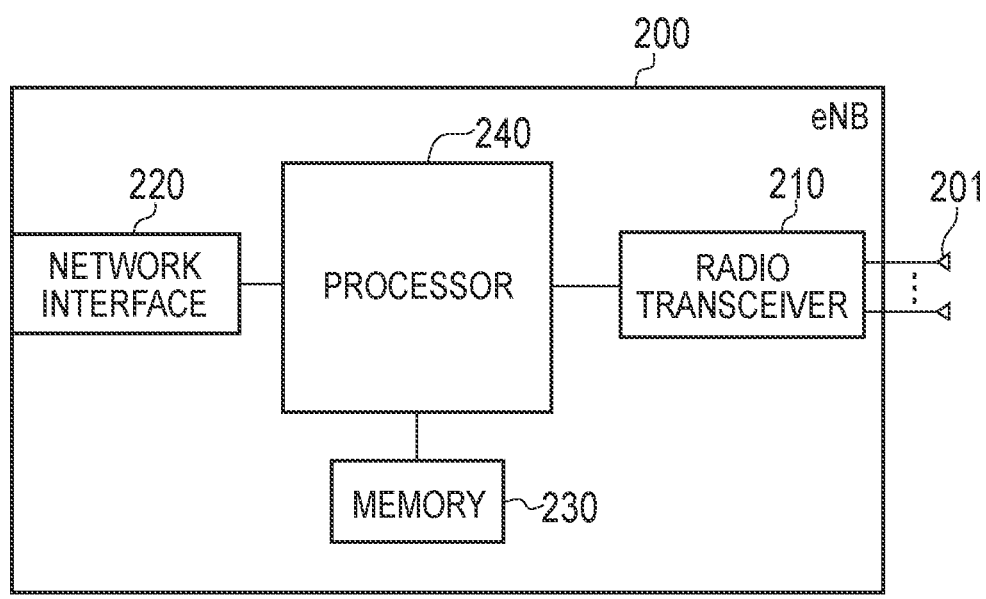
FIG. 3 is a block diagram of an eNB 200 according to an embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 constitute a controller. The radio transceiver 210 (and/or the network interface 220) and the processor 240 constitute a transmitter and a receiver. The memory 230 may be integrated with the processor 240, and this set (that is, chipset) may be the processor.

The antenna 201 and the radio transceiver 210 are used for transmitting and receiving radio signals. The radio transceiver 210 converts a baseband signal (transmission signal) output by the processor 240 into a radio signal and transmits the radio signal from the antenna 201. The radio transceiver 210 converts a radio signal received by the antenna 201 into a baseband signal (reception signal) and outputs the baseband signal to the processor 240.

The network interface 220 is connected to a neighbour eNB 200 via the X2 interface. The network interface 220 is connected to the MME/S-GW 300 via the S1 interface. The network interface 220 is used for communication performed on the X2 interface and communication performed on the S1 interface.

The memory 230 stores a program to be executed by the processor 240 and information to be used for processing by the processor 240. The processor 240 includes a baseband processor and a central processing unit (CPU). The baseband processor modulates and demodulates the baseband signal, encodes and decodes the baseband signal, and the like. The CPU executes a program stored in the memory 230 and performs a variety of processes. The processor 240 executes various processes and various communication protocols to be described later.

Figure 4:
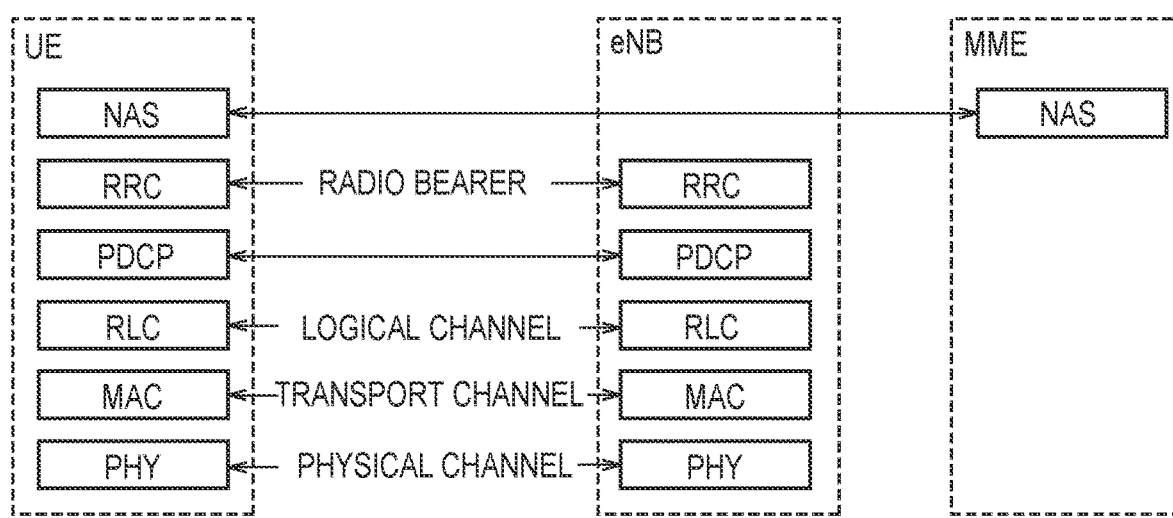
FIG. 4 is a protocol stack diagram of a radio interface according to an embodiment.

FIG. 4 is a protocol stack diagram of a radio interface in the LTE system. As illustrated in FIG. 4, a radio interface protocol is divided into first to third layers of an OSI reference model. The first layer is a physical (PHY) layer. The second layer includes a medium access control (MAC) layer, a radio link control (RLC) layer, and a packet data convergence protocol (PDCP) layer. The third layer includes a radio resource control (RRC) layer.

The PHY layer performs coding and decoding, modulation and demodulation, antenna mapping and demapping, and resource mapping and demapping. User data and control information are transmitted between the PHY layer of the UE 100 and the PHY layer of the eNB 200 via a physical channel.

The MAC layer performs priority control of data, a retransmission process by hybrid ARQ (HARQ), a random access procedure, and the like. User data and control information are transmitted between the MAC layer of the UE 100 and the MAC layer of the eNB 200 via a transport channel. The MAC layer of the eNB 200 includes a scheduler. The scheduler determines uplink and downlink transport formats (transport block size, modulation and coding scheme (MCS)) and resource blocks allocated to the UE 100.

The RLC layer transmits data to the RLC layer on the receiving side by using the functions of the MAC layer and the PHY layer. User data and control information are transmitted between the RLC layer of the UE 100 and the RLC layer of the eNB 200 via a logical channel.

The PDCP layer performs header compression and decompression, and encryption and decryption. It should be noted that a transmitting entity for transmitting a data unit (PDCP PDU) or a receiving entity for receiving a data unit (PDCP PDU) is formed in the PDCP layer.

The RRC layer is defined only in a control plane that handles the control information. Control information (RRC message) for various configurations is transmitted between the RRC layer of the UE 100 and the RRC layer of the eNB 200. The RRC layer controls logical channels, transport channels, and physical channels in response to establishment, re-establishment, and release of radio bearers. If there is a connection (RRC connection) between the RRC of the UE 100 and the RRC of the eNB 200, the UE 100 is in an RRC connected state. If there is no connection (RRC connection) between the RRC of the UE 100 and the RRC of the eNB 200, the UE 100 is in an RRC idle state.

A non-access stratum (NAS) layer, which is located above the RRC layer, performs session management, mobility management, and the like.

Figure 5:
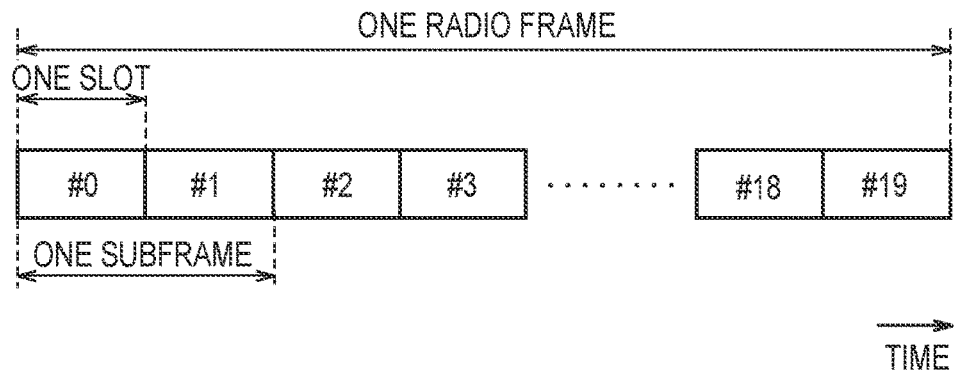
FIG. 5 is a configuration diagram of a radio frame used in the LTE system according to an embodiment.

FIG. 5 is a configuration diagram of a radio frame used in the LTE system. In the LTE system, orthogonal frequency division multiple access (OFDMA) is applied to downlink, and single carrier frequency division multiple access (SC-FDMA) is applied to uplink.

As illustrated in FIG. 5, the radio frame includes ten subframes arranged in a time direction. Each subframe includes two slots arranged in the time direction. A length of each subframe is 1 ms, and a length of each slot is 0.5 ms. Each subframe includes a plurality of resource blocks (RB) in a frequency direction and includes a plurality of symbols in the time direction. Each resource block includes a plurality of subcarriers in the frequency direction. One symbol and one subcarrier constitute one resource element (RE). Among the radio resources (time and frequency resources) allocated to the UE 100, the frequency resource can be specified by the resource block and the time resource can be specified by the subframe (or slot).

(Application Scene)

Figure 6:
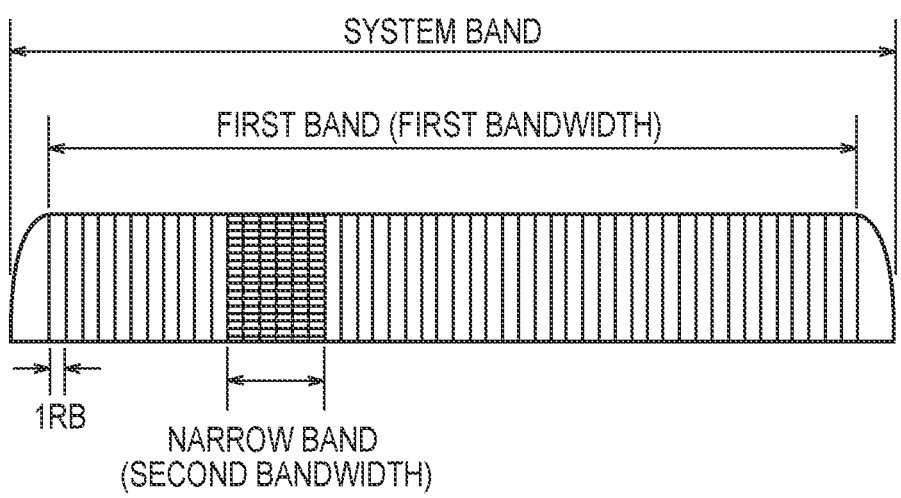
FIG. 6 is a diagram for explaining an application scene according to an embodiment.
Figure 7:
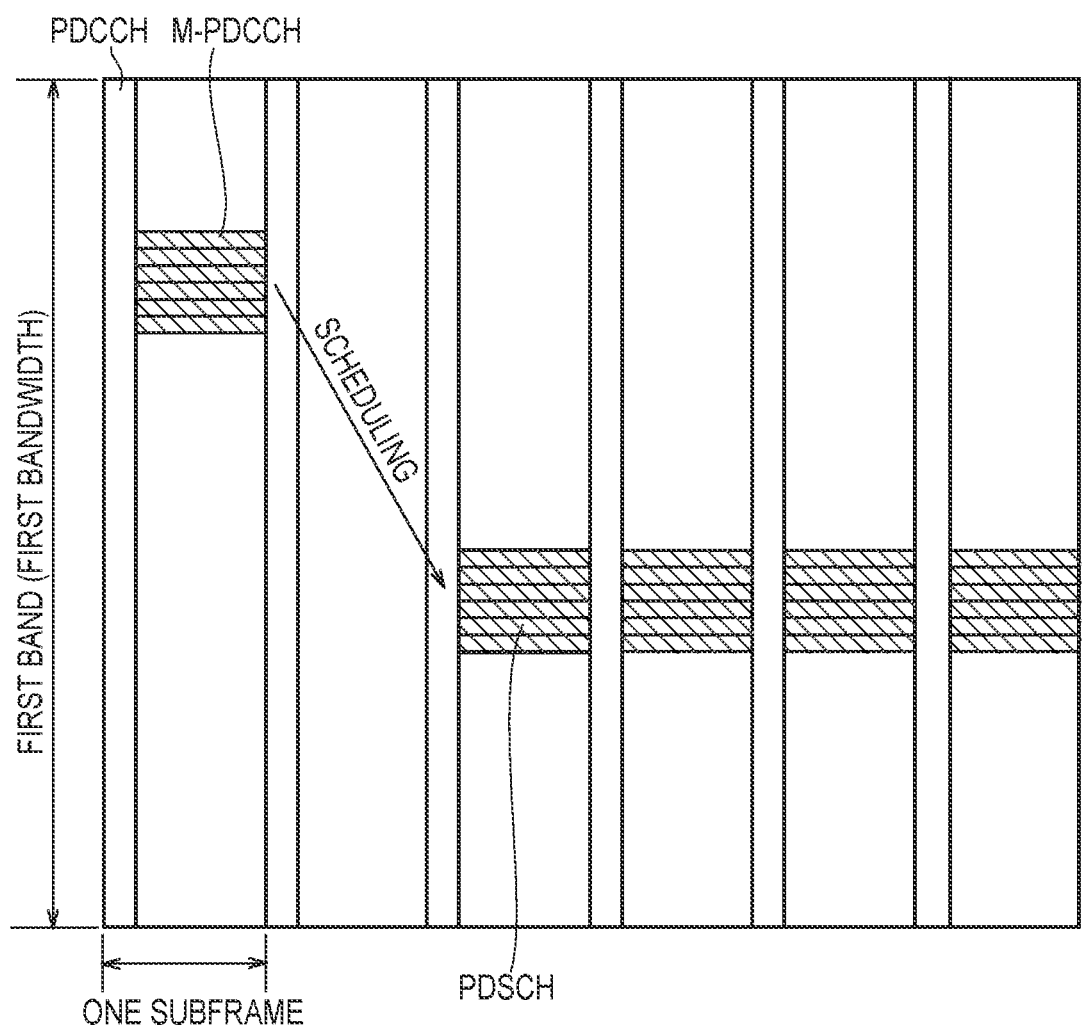
FIG. 7 is a diagram for explaining an application scene according to an embodiment.

Application scene will be described. FIGS. 6 to 8 are diagrams for explaining an application scene according to an embodiment. In the following, the predetermined communication (MTC: Machine Type Communication) in the LTE system will mainly be described.

As illustrated in FIG. 6, the bandwidth of the system band of the LTE system is 10 MHz. The system band includes a first band of a first bandwidth compatible with a general first user terminal, and a second band (hereinafter, narrow band) of a second bandwidth compatible with a second user terminal (hereinafter, MTC terminal) corresponding to the MTC. The first bandwidth is, for example, 50 PRB (physical resource block)=9 MHz. The second bandwidth is, for example, 6 PRB (physical resource block)=1.08 MHz. The narrow band is a part of the first band. Under such a premise, the above-described MTC is a technology for performing predetermined communication (hereinafter, MTC) between the MTC terminal and the eNB 200 by using the narrow band.

As illustrated in FIG. 7, the MTC terminal in the MTC cannot receive a physical downlink control channel (PDCCH), and a predetermined control channel (hereinafter, MTC physical downlink control channel (M-PDCCH)) used for the MTC is adopted. The M-PDCCH is used for transmission of predetermined control information (hereinafter, downlink control information (DCI)) used for the MTC. In the MTC, repeated transmission is adopted from the viewpoint of improving the reachability of a signal from a transmitting node to a receiving node. For example, if the transmitting node is the eNB 200 and the receiving node is the MTC terminal, the transmission of physical downlink shared channel (PDSCH) is repeated over a plurality of subframes, as illustrated in FIG. 7.

As illustrated in FIG. 8, in the MTC, a predetermined number of times of repetitions is determined as the number of times of repetitive transmissions. Specifically, if the maximum number of times of repetitions is not configured in the higher layer (for example, the RRC layer), the predetermined number of times of repetitions is one time (=n1), twice (=n2), four times (=n3), and eight times (=n4). If the maximum number of times of repetitions is sixteen times, the predetermined number of times of repetitions is selected from among one time (=n1), four times (=n2), eight times (=n3), and sixteen times (=n4). If the maximum number of times of repetitions is thirty-two times, the predetermined number of times of repetitions is selected from among one time (=n1), four times (=n2), sixteen times (=n3), and thirty-two times (=n4). The predetermined number of times of repetitions is designated by information (n1 to n4) included in the DCI of the M-PDCCH.

Under such a background, there is a need to use the MTC not only for sensors that are supposed to have small capacity data communication but also for wearable terminals that are expected to have larger capacity data communication than the sensors. In order to satisfy such a need, it is desired to increase the throughput in the MTC.

In an embodiment, for the purpose of increasing the throughput in the MTC, a method for finely controlling the number of times of repetitions is proposed, as compared with the predetermined number of times of repetitions in the background art.

Specifically, under an environment in which the predetermined number of times of repetitions is transmitted from the eNB 200, if the predetermined condition is satisfied, the repeated transmission in the MTC is stopped with the number of times of repetitions different from the predetermined number of times of repetitions. Such a technology may be applied to downlink communication in which the transmitting node is the eNB 200 and the receiving node is the MTC terminal. Such a technology may be applied to uplink communication in which the transmitting node is the MTC terminal and the receiving node is the eNB 200.

Specifically, the eNB 200 transmits information specifying the number of times of offsets with respect to the predetermined number of times of repetitions. In such a case, the transmitting node stops repeated transmission in the MTC with the number of times of repetitions based on the number of times of offsets and the predetermined number of times of repetitions. The number of times of offsets may be a value to be subtracted from the predetermined number of times of repetitions. The number of times of offsets may be a value to be added to the predetermined number of times of repetitions. The number of times of repetitions based on the number of times of offsets and the predetermined number of times of repetitions may be determined so as not to exceed the above-described maximum number of times of repetitions.

Here, if the number of times of offsets is not notified or the number of times of offsets is zero, the transmitting node stops repeated transmission with a predetermined number of times of repetitions designated by the DCI of the M-PDCCH. On the other hand, if the number of times of offsets is other than zero, the transmitting node stops repeated transmission in the MTC with the number of times of repetitions based on the predetermined number of times of repetitions and the number of times of offsets designated by the DCI of the M-PDCCH. Therefore, the above-described predetermined condition is that the number of times of offsets is other than zero.

The eNB 200 notifies the information specifying the number of times of offsets. For example, the eNB 200 may include information specifying the number of times of offsets in the DCI of the M-PDCCH and then transmit the DCI of the M-PDCCH. As the information specifying the number of times of offsets, for example, the following information can be considered.

First, the information specifying the number of times of offsets may be information directly indicating the number of times of offsets. Such information may be newly defined as extension information of the DCI of the existing technology.

Second, under the premise that the list defining the number of times of candidates for the number of times of offsets is predetermined, the information specifying the number of times of offsets may be information specifying the number of times of candidates used as the number of times of offsets among the number of times of candidates defined in the list. For example, if the number of times of candidates for "−2", "−1", "+1", and "+2" is defined in the list, the information specifying the number of times of offsets is information designating one of "−2", "−1", "+1", and "+2".

If a plurality of lists defining different number of times of candidates are prepared, the lists may be determined according to the maximum number of times of repetitions determined by the higher layer. For example, a list to be applied to a case in which the maximum number of times of repetitions is not configured, a list to be applied to a case in which the maximum number of times is configured as sixteen times, and a list to be applied to cases in which the maximum number of times of repetitions is configured as thirty-two times may be prepared. The number of times of candidates defined in these lists may be different from each other.

In the above-described case, the information specifying the number of times of offsets is notified by transmission of the DCI of the M-PDCCH. However, the embodiment is not limited thereto. The notification of the information specifying the number of times of offsets may be performed as follows.

First, the number of times of offsets may be determined based on the transmission candidate position of the M-PDCCH used for the MTC. In such a case, information specifying the number of times of offsets is notified by the transmission candidate position. The transmission candidate position of the M-PDCCH may be included in, for example, a system information block (SIB) defined for the MTC.

Second, the number of times of offsets is determined based on the mask used for decoding the M-PDCCH used for the MTC. In such a case, the information specifying the number of times of offsets is notified by the transmission of information for generating the mask. For example, the mask is a mask used for cyclic redundancy check (CRC), and the value (type) of the mask and the number of times of offsets may be associated with each other. The value of the mask may be designated by information included in the system information block (SIB) defined for the MTC.

In these cases, the transmission of the information for generating the mask or the transmission candidate position of the M-PDCCH may be directly associated with the number of times of offsets, and may be associated with the number of times of candidates defined in the list.

In an embodiment, the number of times of offsets may be determined as follows. For example, the number of times of offsets to be applied to the downlink communication from the eNB 200 to the MTC terminal is determined based on the reception quality of the downlink communication in the MTC terminal. The number of times of offsets to be applied to the uplink communication from the MTC terminal to the eNB 200 is determined based on the reception quality of the uplink communication in the eNB 200. The reception quality may be, for example, reference signal received power (RSRP), or may be a signal to noise ratio (SNR) or a signal to interference noise ratio (SINR) of data in the MTC.

Furthermore, the number of times of offsets to be applied to the downlink communication from the eNB 200 to the MTC terminal may be determined based on information acquired from a neighbour terminal geographically located near the MTC terminal. The eNB 200 may specify the neighbour terminal based on position information (GPS information) of the MTC terminal and the neighbour terminal. The eNB 200 may specify the neighbour terminal based on the arrival direction and the reception strength of the signal from the MTC terminal and the neighbour terminal. The information acquired from the neighbour terminal may be the reception quality of the downlink communication. If the neighbour terminal is the MTC terminal, the information acquired from the neighbour terminal may be information indicating the number of times of repetitions at which the neighbour terminal has successfully received the signal.

(Mobile Communication Method)

Figure 9:
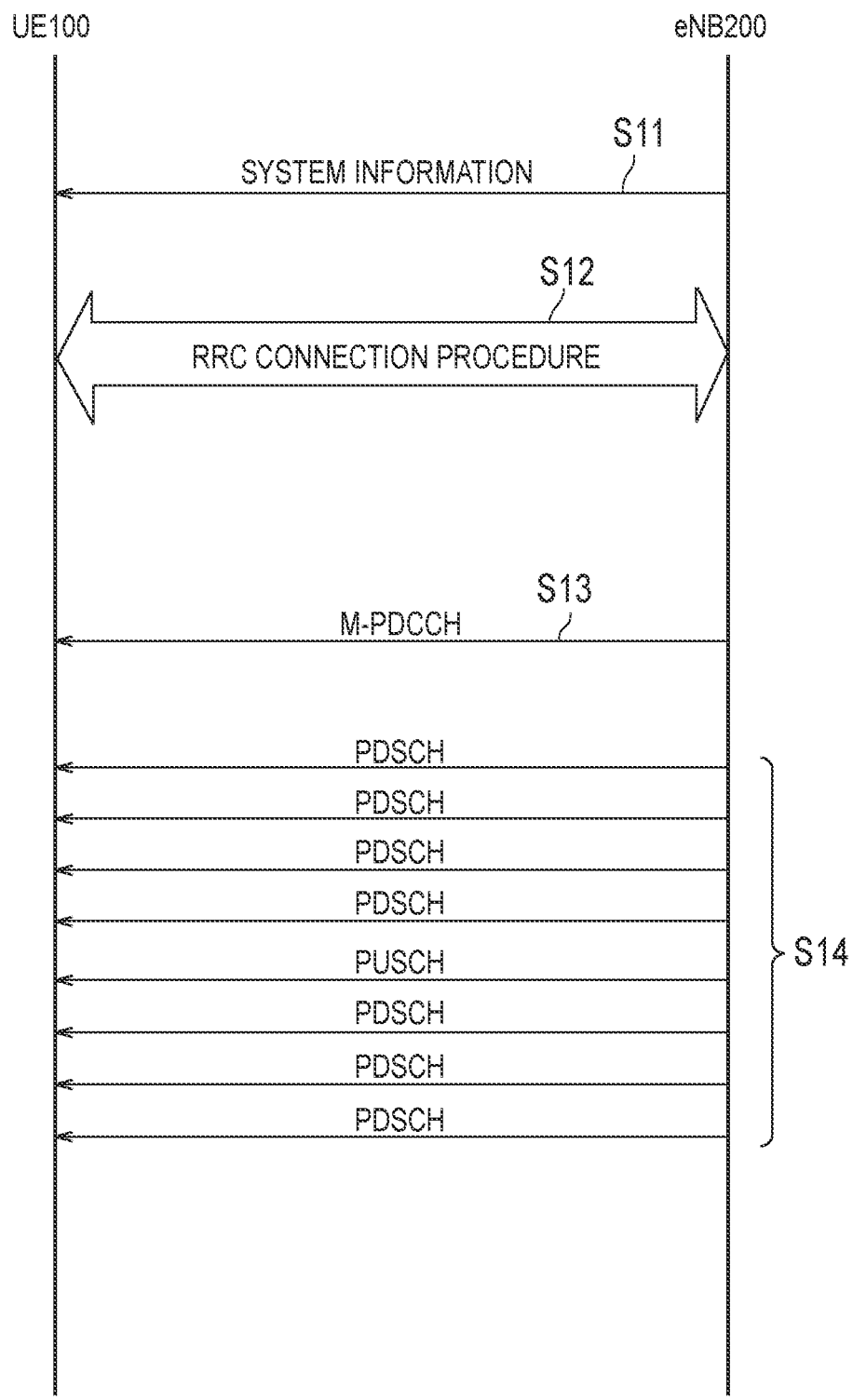
FIG. 9 is a sequence diagram illustrating a mobile communication method according to an embodiment.

A mobile communication method will be described. FIG. 9 is a diagram for explaining a mobile communication method according to an embodiment. In FIG. 9, a case in which the UE 100 is the MTC terminal and the MTC of the downlink communication is performed will mainly be described.

As illustrated in FIG. 9, in step S11, the eNB 200 notifies system information. The system information is a master information block (MIB) and an SIB. The SIB is an SIB defined for the MTC.

In step S12, an RRC connection procedure is performed. In the RRC connection procedure, communication of RRC messages such as an RRC connection request and an RRC connection setup is performed.

In step S13, the eNB 200 transmits an M-PDCCH to the UE 100. The DCI of the M-PDCCH includes at least information indicating a predetermined number of times of repetitions.

In step S14, the eNB 200 repeatedly transmits a PDSCH. The eNB 200 stops repeated transmission in the MTC with the number of times of repetitions based on the number of times of offsets and the predetermined number of times of repetitions.

Here, information specifying the number of times of offsets is notified to the UE 100. As described above, various methods may be considered as the method for notifying the information specifying the number of times of offsets.

In FIG. 9, the MTC of the downlink communication is exemplified, but the embodiment is also applicable to the MTC of the uplink communication.

(Operation and Effect)

In an embodiment, it is possible to expect an increase in throughput in the MTC since the eNB 200 stops repeated transmission in the MTC with the number of times of repetitions based on the number of times of offsets and the predetermined number of times of repetitions. For example, if one time, four times, eight times, and sixteen times are defined as the predetermined number of times of repetitions, it is possible to perform nine repeated transmissions by using the number of times of offsets in an environment in which signal reception is successful with nine repeated transmissions. Furthermore, according to the introduction of the number of times of offsets, it is possible to suppress an increase in amount of data transmitted from the eNB 200, as compared with a case in which the predetermined number of times of repetitions is finely defined.

[Modification 1]

Modification 1 will be described. A difference from the embodiment will be mainly described below.

In modification 1, a stop indication requesting the stop of repetition transmission is used without using the number of times of offsets described above. Specifically, if the receiving node succeeds in receiving the signal from the transmitting node, the receiving node transmits the stop indication to the transmitting node requesting the stop of repeated transmission.

Modification 1 may be applied to downlink communication in which the transmitting node is the eNB 200 and the receiving node is the MTC terminal. Modification 1 may be applied to uplink communication in which the transmitting node is the MTC terminal and the receiving node is the eNB 200.

First, the stop indication may be hybrid automatic repeat request (HARQ) acknowledgment. Specifically, if the receiving node succeeds in receiving the signal from the transmitting node, the receiving node transmits the HARQ acknowledgment (Ack) to the transmitting node even before the number of times of repeated transmissions reaches the predetermined number of times of repetitions. In the existing technology, it should be noted that the HARQ acknowledgment (Ack) is transmitted after the number of times of repeated transmissions reaches the predetermined number of times of repetitions.

Second, the stop indication may be newly defined as a signal used for the MTC. In the downlink communication, the stop indication may be an information element included in a newly defined physical uplink control channel (PUCCH). In the uplink communication, the stop indication may be defined as a new DCI included in the M-PDCCH. In such a case, if the downlink communication with higher priority than the MTC occurs, the eNB 200 may transmit the stop indication by unicast or broadcast.

In such a case, the timing of transmitting the stop indication is, for example, as follows.

For example, in a system using full duplexing-frequency division duplex (FD-FDD), the transmission timing of the stop indication is not particularly limited. Therefore, the stop indication may be transmitted if the signal from the transmitting node is successfully received. The stop indication may be transmitted after a predetermined time (for example, 4 msec) has elapsed from the successful reception of the signal from the transmitting node. Such a procedure can be applied not only to the downlink communication but also to the uplink communication.

In a system using half duplexing-frequency division duplex (HD-FDD), a subframe that can be used for uplink and downlink is notified from the eNB 200 by SIB 1-BR (Bandwidth Reduced). Therefore, in the downlink communication, the MTC terminal may transmit the stop indication at an uplink subframe (transmission candidate position) designated by the eNB 200. In the uplink communication, the eNB 200 may transmit the stop indication at a downlink subframe (transmission candidate position) designated by the eNB 200.

In a system using time division duplex (TDD), a subframe that can be used for uplink and downlink is predetermined. Therefore, in the downlink communication, the MTC terminal may transmit the stop indication at an uplink subframe (transmission candidate position) designated by the eNB 200. In the uplink communication, the eNB 200 may transmit the stop indication at a downlink subframe (transmission candidate position) designated by the eNB 200.

Figure 10:
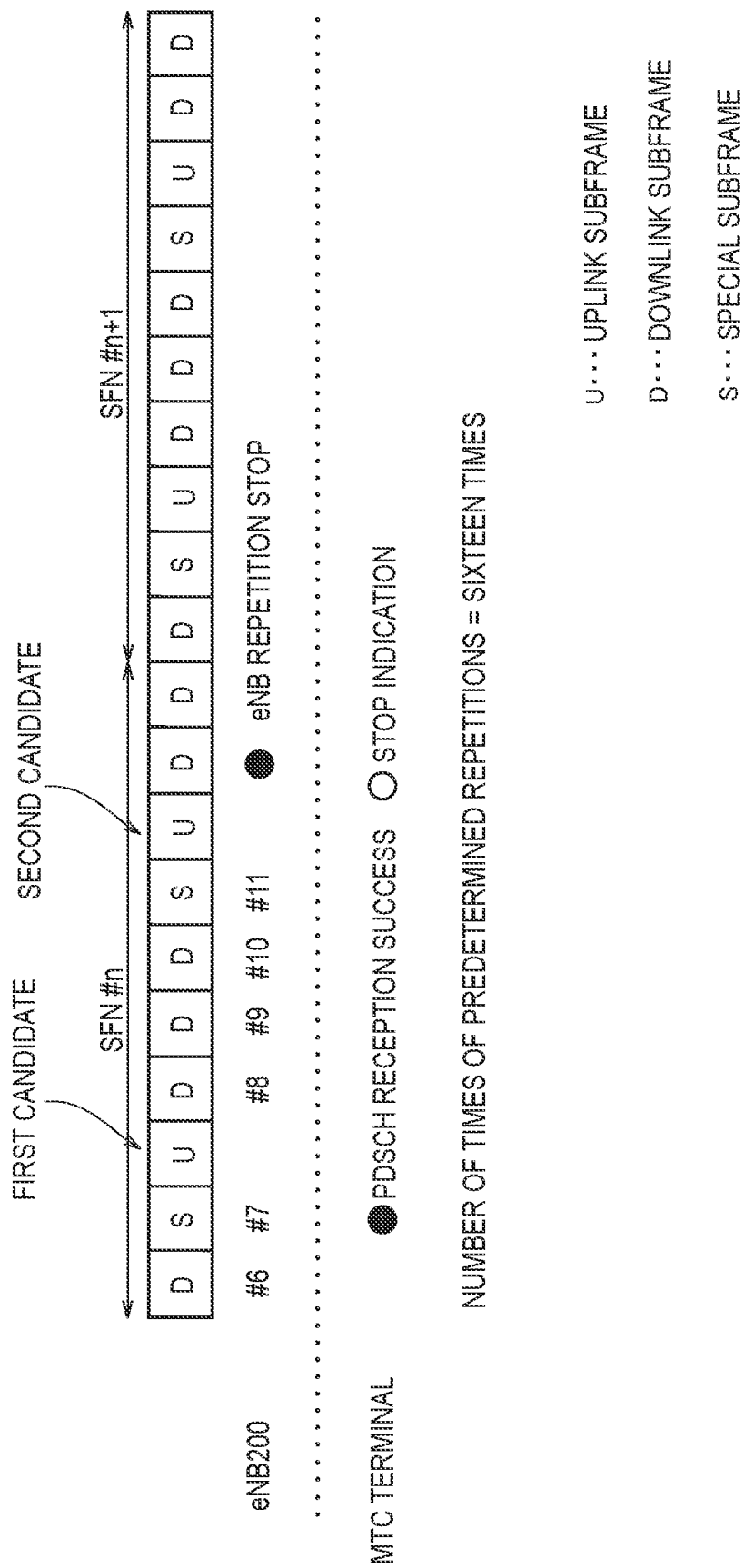
FIG. 10 is a diagram for explaining modification 1.

Here, the downlink communication in the system using the TDD will be described with reference to FIG. 10 as an example. As illustrated in FIG. 10, if the reception of the signal is successful by the seventh repeated transmission, the MTC terminal may transmit the stop indication at the second candidate uplink subframe without transmitting the stop indication at the first candidate uplink subframe. The reason why the stop indication is not transmitted at the first candidate uplink subframe is that a predetermined time (for example, 4 msec) has not elapsed since successful signal reception.

In the case illustrated in FIG. 10, the MTC terminal transmits the stop indication since sixteen times repeated transmissions are not performed during the period from the successful signal reception to the second candidate uplink subframe. However, the MTC terminal may not transmit the stop indication at the second candidate uplink subframe during the period from the successful signal reception to the second candidate uplink subframe even in the case in which sixteen times repeated transmissions are performed.

That is, the receiving node may transmit the stop indication if repeated transmission has not ended over the predetermined number of times of repetitions during the period from the successful signal reception from the transmitting node to the transmission candidate position. The receiving node may not transmit the stop indication if repeated transmission is completed over the predetermined number of times of repetitions during the period from the successful signal reception from the transmitting node to the transmission candidate position.

In modification 1, the opportunity to transmit the stop indication is not particularly limited, but the opportunity to transmit the stop indication may be predetermined or may be limited by the signal transmitted from the eNB 200. The opportunity to transmit the stop indication may be defined by, for example, the number of times of repeated transmissions.

For example, if the predetermined number of times of repetitions is sixteen times, the stop indication may be transmitted only on the opportunity such as four times, eight times, twelve times, or the like. That is, if the signal reception is successful with the first to fourth repeated transmissions, the stop indication may be transmitted as a response to the fourth repeated transmission. If the signal reception is successful with the fifth to eighth repeated transmissions, the stop indication may be transmitted as a response to the eighth repeated transmission. If the signal reception is successful with the ninth to twelfth repeated transmissions, the stop indication may be transmitted as a response to the twelfth repeated transmission. If the signal reception is successful with the thirteenth or subsequent repeated transmissions, HARQ acknowledgment (Ack) may be transmitted as a response to the sixteenth repeated transmission as in the existing technology.

By adopting such a configuration, it is possible to reduce the overhead of allocating the transmission resources of the stop indication for each repeated transmission. In the uplink communication, it is possible to reduce the load on which the MTC terminal monitors the stop indication from the eNB 200.

(Mobile Communication Method)

Figure 11:
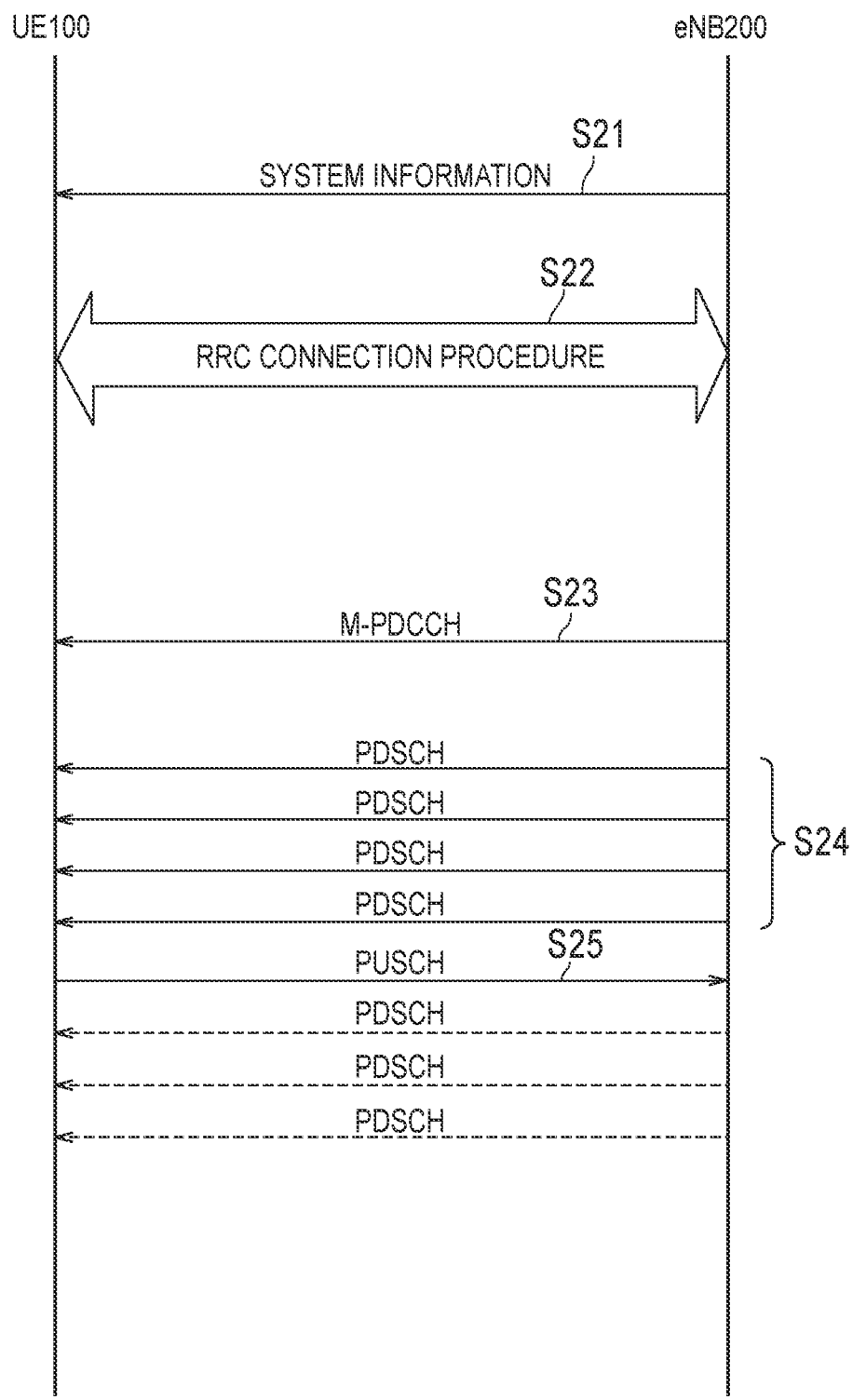
FIG. 11 is a diagram for explaining modification 1.

A mobile communication method will be described. FIG. 11 is a diagram for explaining a mobile communication method according to modification 1. In FIG. 11, a case in which the UE 100 is the MTC terminal and the MTC of the downlink communication is performed will mainly be described.

As illustrated in FIG. 11, in step S21, the eNB 200 notifies system information. The system information is a master information block (MIB) and an SIB. The SIB is an SIB defined for the MTC.

In step S22, an RRC connection procedure is performed. In the RRC connection procedure, communication of RRC messages such as an RRC connection request and an RRC connection setup is performed.

In step S23, the eNB 200 transmits an M-PDCCH to the UE 100. The DCI of the M-PDCCH includes at least information indicating a predetermined number of times of repetitions.

In step S24, the eNB 200 starts repeated transmission of the PDSCH based on the predetermined number of times of repetitions.

In step S25, the UE 100 transmits the PUSCH including the stop indication to the eNB 200 in response to successful reception of the PDSCH. In response to the reception of the stop indication, the eNB 200 stops repeated transmission of the PDSCH even if the number of times of repeated transmissions has not reached the predetermined number of times of repetitions.

In FIG. 11, the MTC of the downlink communication is exemplified, but modification 1 is also applicable to the MTC of the uplink communication.

(Operation and Effect)

In modification 1, if the receiving node succeeds in receiving the signal from the transmitting node, the receiving node transmits the stop indication to the transmitting node requesting the stop of repeated transmission. Therefore, since unnecessary repeated transmission is not performed, an increase in throughput in the MTC can be expected.

[Modification 2]

Modification 2 will be described. A difference from the embodiment will be mainly described below.

In modification 2, the allocation of an extended band having a bandwidth wider than a second bandwidth (6 PRB) in one unit time (subframe) will be described. It should be noted that the existing technology does not allocate a band exceeding the second bandwidth to one MTC terminal in one subframe.

Specifically, the eNB 200 transmits narrow band allocation information specifying the extended band allocated to the MTC terminal in one subframe. The extended band may include two or more narrow bands (6 PRB).

Here, as illustrated in FIG. 6, since the first band is 50 PRB and the narrow band is 6 PRB, 2 PRBs remain. Therefore, a case in which the first band includes a band not used as a narrow band is considered. In such a case, the extended band may include a band (2 PRB) not used as a narrow band.

In modification 2, the narrow band allocation information is included in the DCI transmitted from the base station via the M-PDCCH used for the MTC.

Figure 12:
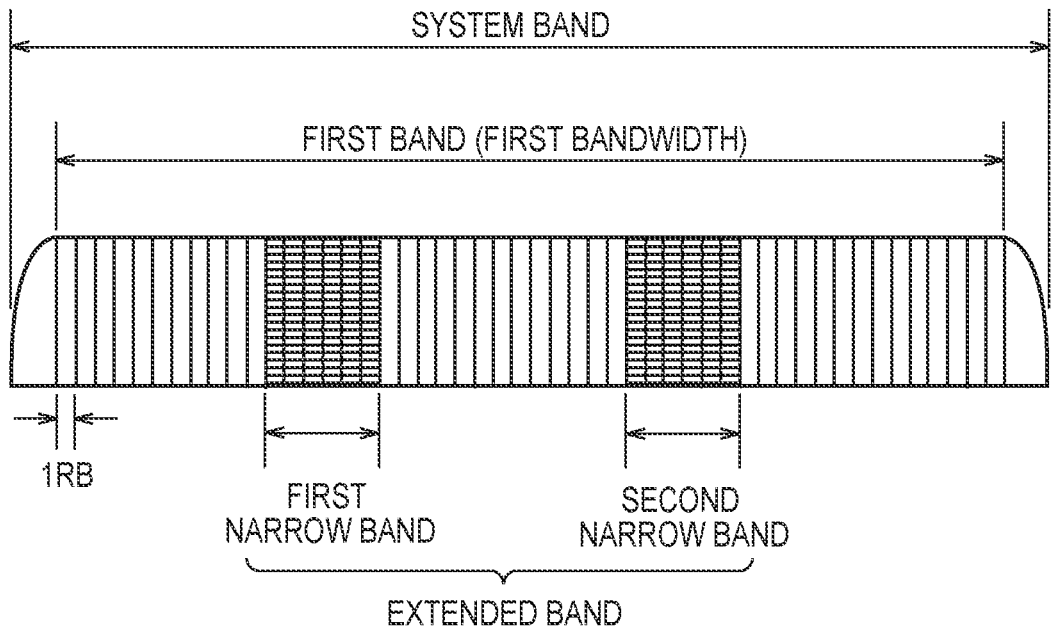
FIG. 12 is a diagram for explaining modification 2.

In such a case, the narrow band allocation information included in the DCI may be information directly indicating the extended band. For example, as illustrated in FIG. 12, if the extended band includes the first narrow band and the second narrow band, the narrow band allocation information is configured by information indicating the position of the first narrow band and information indicating the position of the second narrow band. Furthermore, the narrow band allocation information may include information indicating the arrangement of the PRBs allocated to the MTC terminal in the extended band.

Figure 13:
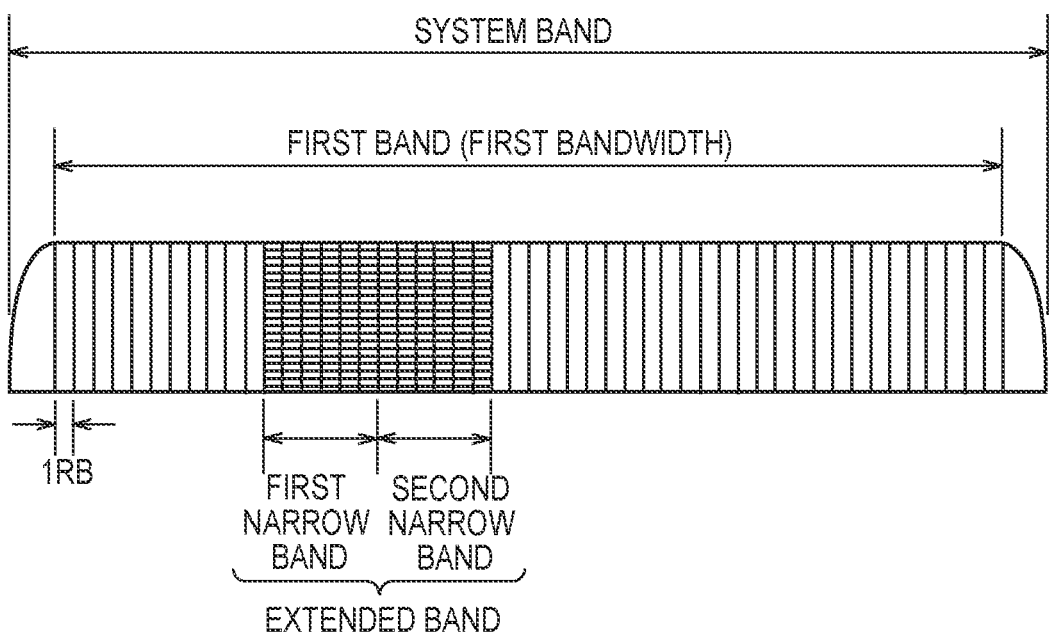
FIG. 13 is a diagram for explaining modification 2.

Alternatively, under the premise that the extended bands are continuous in the frequency direction, the narrow band allocation information included in the DCI may be information indicating the head position of the extended band and the length of the extended band in the frequency direction. For example, as illustrated in FIG. 13, if the extended band includes the first narrow band and the second narrow band that are continuous with each other, the narrow band allocation information includes the position of the first narrow band and the length of the extended band (for example, the number of PRBs equal to or less than 12 PRB).

Figure 14:
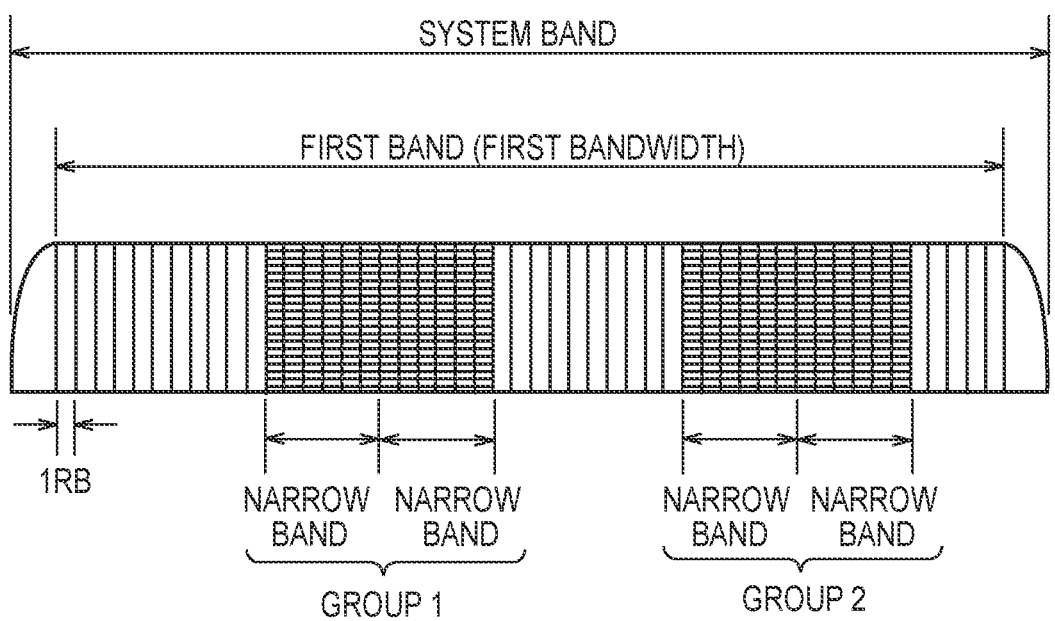
FIG. 14 is a diagram for explaining modification 2.

Alternatively, on the premise that a table including a group associated with an extended band is defined, the narrow band allocation information included in the DCI may be information (index) indicating the group included in the table. For example, as illustrated in FIG. 14, if group 1 and group 2 are associated as the group associated with the extended band, the narrow band allocation information is information indicating at least one of group 1 and group 2. Furthermore, the narrow band allocation information may include information indicating the arrangement of the PRBs allocated to the MTC terminal in the extended band.

In modification 2, the narrowband allocation information may be an information element included in a radio resource control (RRC) message.

In such a case, the information element included in the RRC message may be an element that designates a method for interpreting DCI transmitted from the eNB 200 via the M-PDCCH used for the MTC. The interpreting method may include at least interpretation that the extended band is allocated. For example, in the cases illustrated in FIGS. 12 and 13, if the first narrow band is allocated by the DCI, the DCI interpreting method is changed by the information element included in the RRC message, and it is interpreted that both the first narrow band and the second narrow band are allocated to the MTC terminal. The interpreting method is arbitrary, and the first narrow band and the second narrow band may not be continuous.

Alternatively, the information element included in the RRC message may be an element directly indicating the extended band allocated exclusively to the MTC terminal. For example, in the cases illustrated in FIGS. 12 and 13, the information element is configured by information indicating the position of the first narrow band and information indicating the position of the second narrow band. Furthermore, the information element may include information indicating the arrangement of the PRBs allocated to the MTC terminal in the extended band. In such a case, the extended band cannot be dynamically allocated as compared with the case in which the narrow band allocation information is included in the DCI, but it is useful in a case in which the extended band is semi-dynamically allocated to the MTC terminal.

Alternatively, on the premise that a table including a group associated with an extended band is defined, the information element included in the RRC message may be information (index) indicating the group included in the table. For example, as illustrated in FIG. 14, if group 1 and group 2 are associated as the group associated with the extended band, the information element is information indicating at least one of group 1 and group 2. Furthermore, the information element may include information indicating the arrangement of the PRBs allocated to the MTC terminal in the extended band. In such a case, the extended band cannot be dynamically allocated as compared with the case in which the narrow band allocation information is included in the DCI, but it is useful in a case in which the extended band is semi-dynamically allocated to the MTC terminal.

Figure 15:
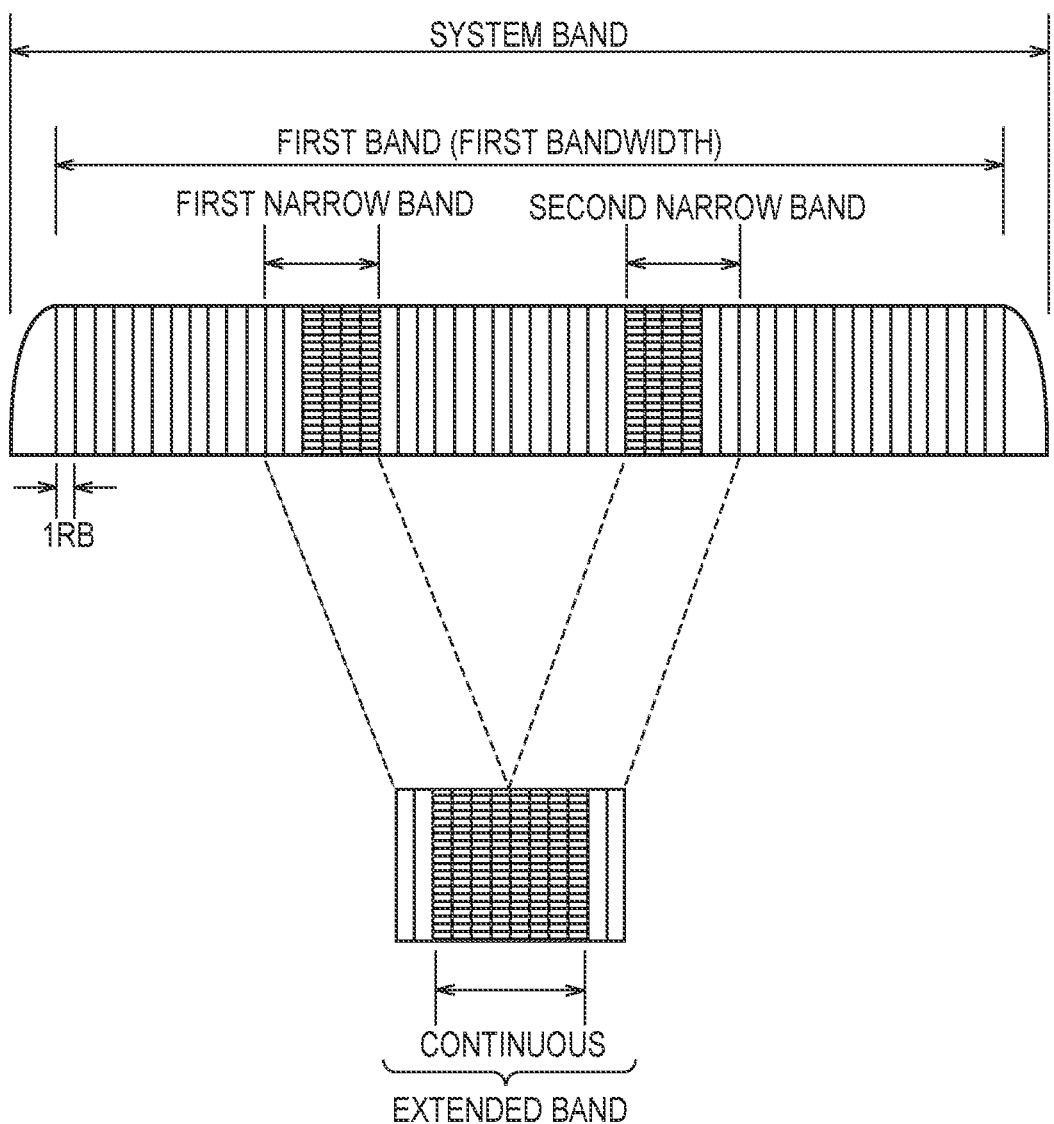
FIG. 15 is a diagram for explaining modification 2.

Here, in modification 2, the PRB allocated to the MTC terminal may be continuously allocated in the extended band. For example, as illustrated in FIG. 15, it is assumed that the extended band includes the first narrow band and the second narrow band, and eight PRBs are allocated to the MTC terminal. In such a case, if only the extended band is extracted, the PRB allocated to the MTC terminal is continuous in the frequency direction. By adopting such an allocation, it is possible to suppress an increase in the power consumption of the transmitting node. In particular, in the uplink communication, it is possible to suppress an increase in the power consumption of the MTC terminal, and such an allocation is useful.

(Operation and Effect)

In modification 2, the extended band having a bandwidth wider than the second bandwidth (6 PRB) in one unit time (subframe) is allocated to the MTC terminal. The MTC terminal communicates with the eNB 200 by using the allocated extended band based on the narrow band allocation information. The eNB 200 performs communication with the MTC terminal by using the allocated extended band. Therefore, an increase in throughput in the MTC can be expected.

OTHER EMBODIMENTS

Although the present disclosure has been described with reference to the above-described embodiments, it should not be understood that the description and drawings constituting a part of this disclosure limit the present disclosure. From this disclosure, various alternative embodiments, examples, and operational technologies will become apparent to those skilled in the art.

Although not specifically described in the embodiment, the PRB allocated to the MTC terminal may be expressed according to the following Formula 1.

[Math. 1]

$$\left\lceil \log_2 \left\lfloor \frac{N_{RB}^{UL}}{6} \right\rfloor \right\rceil \Big| 5 \text{ bit} \quad \text{Formula 1}$$

In such a case, the Log part is a part indicating the position of the narrow band, and 5-bit is a part indicating the arrangement of the PRBs. Therefore, as described in modification 2, if the narrow band allocation information is included in the DCI of the M-PDCCH, the narrow band allocation information may include information indicating the Log part for indicating positions of two or more narrow bands. Furthermore, the narrow band allocation information may include 5 bits indicating the allocation of the PRBs allocated to the MTC terminal for each narrow band. However, the arrangement of the PRBs allocated to the MTC terminal may be the same between two or more narrow bands.

Although not specifically described in the embodiment, a program for causing a computer to execute each process to be performed by the UE 100 and the eNB 200 may be provided. The program may be recorded on a computer-readable medium. The program may be installed on the computer by using the computer-readable medium. Here, the computer-readable medium on which the program is recorded may be a non-transitory recording medium. The non-transitory recording medium is not particularly limited, but may be a recording medium such as, for example, CD-ROM and DVD-ROM.

Alternatively, a chip constituted by a memory that stores a program for executing each process performed by the UE 100 and the eNB 200 and a processor that executes the program stored in the memory may be provided.

In the embodiment, the LTE system has been described as an example of the mobile communication system. However, the embodiment is not limited thereto. The mobile communication system may be a system other than the LTE system.

[Additional Note]

(1) Introduction

Further Enhanced MTC for LTE WI was approved that included a task to support the higher data rate than 1 Mbps for voice capable wearable devices and health monitoring devices. In this additional note, we propose our view on design for higher date rate.

(2) Reusing Rel.13 features

We should consider to maximally harvest the power consumption, complexity reduction and link budget enhancements features enabled by using the existing Rel-13 eMTC. To obtain a low-complexity UE the existing MTC design supports a narrow bandwidth (NB) consisting of only 6 PRBs. As a consequence, the MTC UEs are not required to support legacy channels such as PCFICH/PHICH/PDCCH that are transmitted using the entire system bandwidth. In addition, MTC also supports repetition transmissions to obtain an improved link budget and extended coverage range.

To achieve the goal of higher data rates for the FeMTC we may have to give up some of the performance of the above features since there is a direct trade off relationship between the higher data rates and low-complexity/improve link-budget improvements. However, having a low complexity UE is an important aspect for the MTC markets; therefore, we propose to begin this WID we must strive to keep the current narrow band design by considering it as the baseline bandwidth.

Proposal 1: The concept of reduced bandwidth (Rel-13) should also be supported as a baseline for FeMTC.

(3) Design for Higher Data Rate (3.1) Maximum TBS (Transport Block Size)

Obviously, to consider increasing the data rates we must consider increasing the maximum allowable TBS. Therefore, RAN1 must consider lifting the max TBS of 1000 bits restriction in MTC R12/13 and raise to TBD.

Proposal 2: Lifting the restriction of max 1000 bits TBS to [TBD] bits TBS should be considered.

(3.2) Wider MTC Channel(s)

As noted in the WID, RAN1 should consider widening the PDSCH/PUSCH channel bandwidth to support data rates greater than 1 Mbps. There are two options to achieve wider channels for MTC. First, as shown in FIG. 16 (Option A), a wider MTC PDSCH channel can be obtained by grouping a contiguous set of baseline 6 RBs wide MTC channels (N×6 RBs MTC channel) to deliver the FeMTC services.

Figure 16:
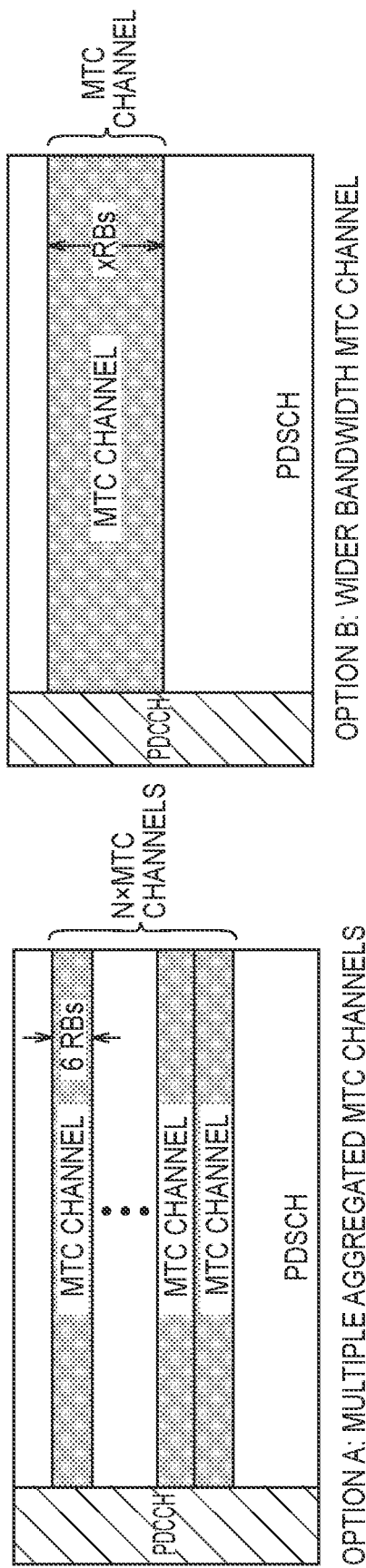
FIG. 16 is a diagram for explaining two options for extending an MTC channel for a FeMTC service.

Second option is shown in FIG. 16 (Option B) simply widening the channel-bandwidth of the MTC PDSCH channel from 6 RBs to [TBD] RBs. In both cases having a contiguous set of RBs maintains the low complexity UE design since it requires a single RF implementation and a simpler channel estimator at the baseband.

Proposal 3: To maintain low-complexity UE design we should consider widening the MTC PDSCH using both option A and B shown in the FIG. 16.

In option A, the existing DCI format 6-0A/1A can be used independently for each MTC PDSCH channel LTE R13). However, if option A is used with single MPDCCH for the multiple MTC channels assignment then a new DCI format would be required.

Proposal 4: If a single MPDCCH for the multiple MTC channels assignment is supported then a new DCI format must be considered.

(3.3) Higher MCS Indexes

The maximum MCS index supported in eMTC is 15 that uses the 16-QAM. One of the ways to increase the throughput is to support higher MCS indexes. There are two options. First approach is to increase the modulation order of the transmissions. Increasing the modulation order to 64-QAM for the DL and the UL requires higher receiver and transmitter UE complexity, respectively. However, it is quite possible the increase in modulation order for the DL might be possible with an acceptable increase in the UE receiver complexity. Therefore, 64-QAM for DL must be studied further. The second approach is to increase the transport block size (TBS) while keeping the modulation order of 16-QAM. This can be done by supporting MCS index 16 in the case of DL.

Both a higher modulation order and/or increase in TBS for DL transmissions must be verified to see if the higher data rates can be supported with a reasonable increase in UE receiver complexity.

(3.4) Reduction in the Number of Repetitions

Another method to achieve higher data rates is to reduce the number of repetitions used for transmissions in eMTC. Repetition mechanism was introduced to improve the link-budget resulting in coverage extension. In the current LTE releases maximum number of repetition for PDSCH/PUSCH is 32 in CE mode A. It is quite possible to reduce the number of repetition transmissions in order to obtain effective higher throughput with the cost of lesser range-coverage, though maximum throughput is not changed. In addition, large number of repetition transmissions causes excessive delay that may not be acceptable for some of the FeMTC type applications.

Proposal 6: we should consider reducing the number of repetitions for some of the scenarios that require higher data rate and lower latency.

In some FeMTC applications the PDSCH/PUSCH repetition may not be required. However, the reduced channel bandwidth might still be used requiring the RB allocation confined to the MTC channel. In such a case legacy DCI formats such as DCI format 0/1/1A can still be reused for the RB assignment.

Proposal 7: we should consider reusing the legacy DCI formats 0/1/1A for FeMTC channel assignments.

The invention claimed is:

1. A mobile communication method comprising:
    performing, by a base station, communication by using a narrow band which is a second bandwidth narrower than a first bandwidth compatible with a first user equipment in one unit time, wherein the second bandwidth is a bandwidth of six resource blocks;
    transmitting, from the base station via an M-PDCCH (MTC Physical Downlink Control Channel), a DCI (Downlink Control Information) including allocation information for allocating a second user equipment an extended band having a third bandwidth wider than the second bandwidth and narrower than the first bandwidth in the one unit time, wherein the third bandwidth is equal to the integral multiple of six resource blocks, the DCI having a predetermined DCI format; and
    transmitting from the base station to the second user equipment, an RRC (Radio Resource Control) message including an information element designating an interpreting method for the allocation information included in the DCI having the predetermined DCI format,
    wherein
    the extended band includes a fixed number of narrow bands,
    a frequency domain includes a plurality of extended bands each identified by an index, and
    the allocation information includes an index identifying one extended band of the plurality of extended bands.

2. The mobile communication method according to claim 1, wherein
    the allocation information comprises information indicating a narrow band included in the extended band.

3. The mobile communication method according to claim 1, further comprising
    performing, by the second user equipment, communication with the base station by using the allocated extended band based on the allocation information received from the base station.

4. The mobile communication method according to claim 1, wherein
    the extended band is constituted by a plurality of narrow bands.

5. The mobile communication method according to claim 1, wherein
    the allocation information indicates a length of the extended band in a frequency direction.

6. The mobile communication method according to claim 1, wherein the information includes information indicating an arrangement of physical resource blocks allocated to the second user equipment in the extended band.

7. The mobile communication method according to claim 1, further comprising:
    transmitting, from the base station, information indicating a predetermined number of times of repetitions in the communication; and
    if a predetermined condition is satisfied, stopping repeated transmission in the communication with the number of times of repetitions different from the predetermined number of times of repetitions.

8. The mobile communication method according to claim 7, further comprising:
    notifying, from the base station, information specifying the number of times of offsets with respect to the predetermined number of times of repetitions,
    wherein the predetermined condition is that the number of times of offsets is other than zero, and
    the stopping includes stopping repeated transmission in the communication with the number of times of repetitions based on the number of times of offsets and the predetermined number of times of repetitions.

9. A base station comprising:
    a controller configured to perform communication by using a narrow band which is a second bandwidth narrower than a first bandwidth compatible with a first user equipment in one unit time, wherein the second bandwidth is a bandwidth of six resource blocks; and
    a transmitter configured to transmit, to a second user equipment via an M-PDCCH (MTC Physical Downlink Control Channel), a DCI (Downlink Control Information) including allocation information for allocating an extended band having a third bandwidth wider than the second bandwidth and narrower than the first bandwidth in the one unit time, wherein the third bandwidth is equal to the integral multiple of six resource blocks, the DCI having a predetermined DCI format, wherein the transmitter is configured to transmit to the second user equipment, an RRC (Radio Resource Control) message including an information element designating an interpreting method for the allocation information included in the DCI having the predetermined DCI format transmitted from the base station via the M-PDCCH, the extended band includes a fixed number of narrow bands, a frequency domain includes a plurality of extended bands each identified by an index, and the allocation information includes an index identifying one extended band of the plurality of extended bands.

10. A user equipment for a system including a base station configured to perform communication by using a narrow band which is a second bandwidth narrower than a first bandwidth compatible with a first user terminal in one unit time, the user equipment comprising:

at least one processor configured to
 receive, from a base station, a DCI (Downlink Control Information) including allocation information for allocating an extended band having a third bandwidth wider than the second bandwidth and narrower than the first bandwidth in the one unit time, wherein the third bandwidth is equal to the integral multiple of six resource blocks, the DCI having a predetermined DCI format, receive, from the base station, an RRC (Radio Resource Control) message including an information element designating an interpreting method for the allocation information included in the DCI having the predetermined DCI format, and perform communication with the base station by using the allocated extended band based on the allocation information received from the base station, wherein the extended band includes a fixed number of narrow bands, a frequency domain includes a plurality of extended bands each identified by an index, and the allocation information includes an index identifying one extended band of the plurality of extended bands.

* * * * *